United States Patent [19]

Jabsen

[11] 4,090,917
[45] May 23, 1978

[54] CONTROL ROD EJECTION RETARDATION ASSEMBLY

[75] Inventor: Felix Stanley Jabsen, Lynchburg, Va.

[73] Assignee: The Babcock & Wilcox Company, New York, N.Y.

[21] Appl. No.: 708,785

[22] Filed: Jul. 26, 1976

[51] Int. Cl.² .......................... G21C 7/08; G21C 9/00
[52] U.S. Cl. ..................................... 176/36 R; 176/38
[58] Field of Search .......................... 176/36 R, 37, 38

[56] References Cited

U.S. PATENT DOCUMENTS

| 3,122,045 | 2/1964 | Zilberfarb | 176/36 R |
| 3,321,372 | 5/1967 | Challender | 176/36 R |
| 3,347,748 | 10/1967 | Olsson | 176/36 R |
| 3,580,805 | 5/1971 | Handel | 176/36 R |
| 3,627,632 | 12/1971 | Acher et al. | 176/36 R |
| 3,844,884 | 10/1974 | Frank et al. | 176/36 R |

*Primary Examiner*—Samuel W. Engle
*Assistant Examiner*—S. A. Cangialosi

*Attorney, Agent, or Firm*—Vytas R. Matas; Joseph M. Maguire

[57] ABSTRACT

A control rod ejection retardation assembly is mounted to a control rod assembly of a nuclear reactor to retard the ejection of the control rod only during an undesired ejection of the control rod while allowing normal control rod movement and "scramming" operation to be drag free and unretarded. The ejection retardation assembly includes a piston assembly mounted to the control rod and having an opening thereto controlled by a ball valve. The piston assembly seals are made loose fitting to allow sufficient fluid flow through the seals to provide unhindered normal control rod movement even with the ball valve sealing the piston assembly opening. During undesired speedy ejection of the control rod, the ball valve seals the opening to prevent fluid flow to the piston assembly retarding piston movement and thereby controlling control rod movement. During a "scram" condition the ball valve unseals the piston opening allowing fluid to easily flow into the piston assembly to prevent any retardation of piston and control rod movement.

7 Claims, 3 Drawing Figures

CONTROL ROD EJECTION RETARDATION ASSEMBLY

This invention was made in the course of work under Contract No. 4-37067 between the Babcock and Wilcox Company and the U.S. Department of Commerce. The Government is licensed under and, on the occurrence of a condition precedent set out in the contract, shall acquire title to this application and any resulting patent.

BACKGROUND OF THE INVENTION

1. Field of the Invention

The present invention relates generally to control rod drives for nuclear reactors and particularly to mechanisms for retarding an undesired ejection of the control rod from the nuclear reactor.

2. Description of the Prior Art

Control rod drives for nuclear reactors comprise sealed pressure vessels which are sealably mounted to the nuclear reactor to connect the control rods of the reactor and to allow the controlled positioning of the rods within the reactor. As such, the housing containing the drive mechanism is maintained at the same pressure as the nuclear reactor. Should the housing of the control rod drive rupture, the leadscrew of the drive mechanism along with the control rod connected thereto could be ejected from the housing by the pressure difference created between the housing and the ambient.

Known prior art control rod drives provide relatively slow movement of the control rods during normal control rod operation with the drive engaging the control rod to prevent the control rod from being ejected. Certain situations are encountered where it is desirable to "scram" or speedily insert the control rod into the nuclear reactor to shut down the reactor. Such a "scram" is usually provided by disengaging the driving element from the control rod and allowing the control rod to drop into the reactor. Thus, during a "scram" condition the control rod could be easily ejected if a rupture were to occur in the housing. A similar condition exists when the reactor is shut down or anytime the drive is disengaged from the control rod. Even when engagement of the control rod with the drive is provided, should a rupture occur which would subject the control rod to the full pressure of the reactor, the engagement between the leadscrew and the drive could be broken or stripped and ejection may still occur. It is therefore highly desirable to retard the ejection of the control rod as much as possible to dissipate the forces ejecting the control rod and prevent catastrophic ejection.

SUMMARY OF THE INVENTION

In accordance with the present invention an ejection retardation system is provided which solves the mentioned problems associated with the prior art devices as well as providing other benefits.

The ejection retardation system of the present invention provides a piston assembly mounted to a control rod assembly of a nuclear reactor. The piston assembly has an opening allowing fluid to controllably flow into the piston assembly. The control of the opening is provided by a ball valve which is pressure actuated to either open or close fluid flow through the opening to the piston. During normal control rod operation, the loose piston seal allows sufficient fluid flow around the seal to leave the normally slow up and down movement of the control rod unretarded whether the ball valve is in the open or closed condition. The piston opening is positioned to insure that during a "scram" condition the ball valve will open allowing fluid to quickly flow into the piston assembly to prevent any retardation of the speedy drop of the control rod. However, should a speedy ejection of the control rod be initiated, the ball valve will close the piston opening forcing the fluid to be displaced around the piston seals. Since the seal clearances are predetermined to allow only a small amount of fluid flow around them, the piston assembly will act to buffer or retard the speedy ejection of the control rod.

In view of the foregoing it will be understood that one aspect of the present invention is to provide an ejection retardation system which will retard control rod ejection but will not interfere with the normal control rod movements required by the control rod drive.

Another aspect of the present invention is to provide an ejection retardation system having a ball valve assembly which will shut off flow to the piston assembly to retard the ejection of a control rod whenever an undesired ejection of the control rod is initiated.

These and other aspects of the present invention will become more apparent after a review of following description of the preferred embodiment when considered with the drawings.

DESCRIPTION OF THE PREFERRED EMBODIMENT

Figure 1:
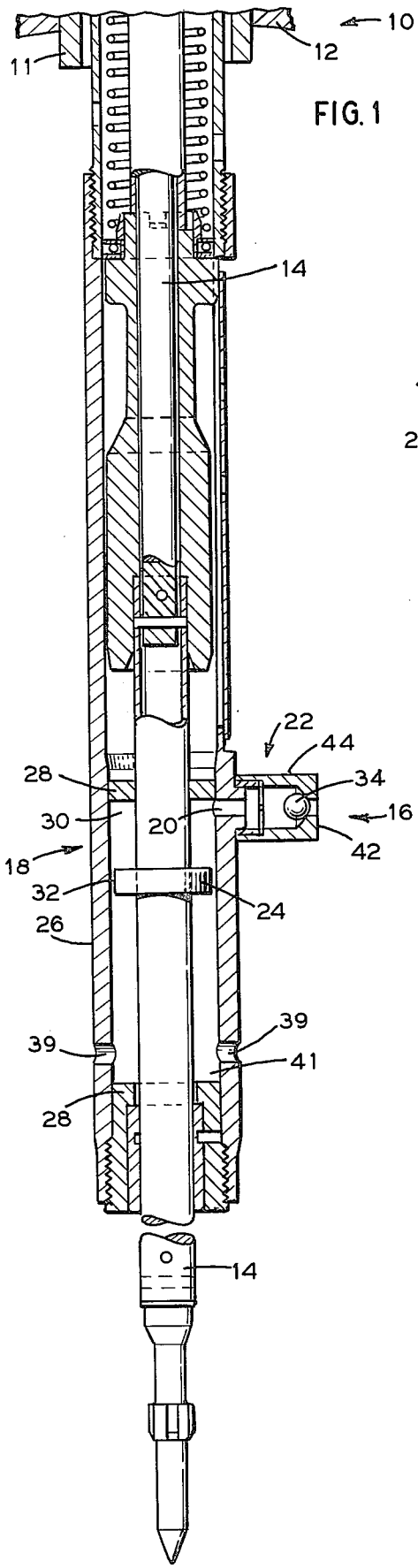
FIG. 1 is a cross-sectional view of a control rod connecting assembly incorporating the ejection retardation system of the present invention.

Referring now to the drawings it will be understood that the showings therein are made for the purposes of describing a preferred embodiment of the invention and are not intended to limit the invention thereto.

FIG. 1 shows the lower part of control rod drive connecting assembly 10. The end 11 of the assembly 10 is adapted to be sealably secured, as by welding, in a standing position to a reactor vessel 12 of a water-containing reactor to thereby seal the control rod drive assembly 10 to the reactor vessel 12. A leadscrew 14 extends downwardly through the open end 11 of the assembly 10 and into the reactor vessel where it is coupled to a control rod (not shown) of the reactor in a manner known to those skilled in the art to thus allow the positioning of the leadscrew 14 to position the control rod.

The leadscrew 14 is moved up and down in the reactor by well-known drives such as planetating roller nut drives wherein a stator causes the engagement and planetation of rollers mounted on lever arms. The construction and operation of the foregoing is well known and a detailed explanation thereof of may be found in U.S. Pat. No. 3,822,439.

It will be appreciated that the reactor and consequently the control rod drive is pressurized to the pressure of the nuclear reactor by its sealed connection thereto through the open end 11 of the housing. Since the pressures in a nuclear reactor may be in the area of 2,000 psi, clearly a dangerous condition may exist should the control rod drive housing rupture. The leadscrew 14 would then be shot out of the housing due to the pressure difference between the ambient and the housing. To prevent the leadscrew 14 from being speedily ejected out of the housing in such a rupture condition, an ejection retardation assembly 16 is mounted to the leadscrew 14. This ejection retardation assembly 16 includes a piston assembly 18 having an opening 20 leading thereto whose open and closed condition is controlled by a ball valve assembly 22. The opening 20 and the ball valve assembly 22 are positioned near the top of the piston assembly 18 with the piston assembly 18 being positioned on the leadscrew 14 to insure that during maximum control rod withdrawal from the reactor the ball valve assembly 22 will be above a piston 24 of the piston assembly 18.

The piston assembly 18 of the present invention includes a cylindrical housing 26 within which the piston 24 is made to move with the leadscrew 14 of the control rod drive by virtue of its mounting thereto. The ends of the housing 26 are sealed by tight seals 28 to form an annular chamber 30 to which flow is controlled by the ball valve assembly 22. As the piston 24 moves in the piston assembly 18 with normal driven movement of the leadscrew 14, the normal slow speed of the leadscrew 14 is unimpaired since liquid easily flows out around the loose clearance area 32 provided between the piston 24 and the cylinder 26. Thus whether the ball valve assembly 22 has the opening 20 blocked or unblocked there is no difference in the normal driven operation of the leadscrew 14 as long as movement speed is relatively slow as in the normal driven conditions.

Figure 2:
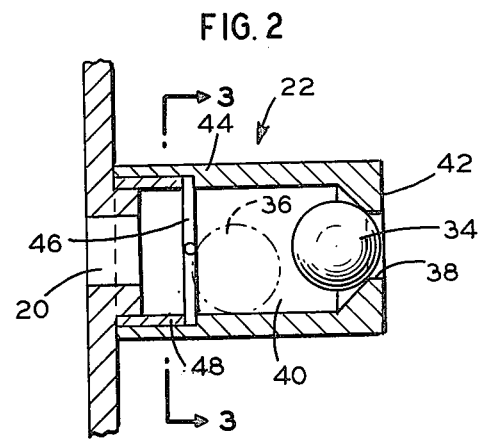
FIG. 2 is an enlarged view of the ball valve assembly of FIG. 1.
Figure 3:
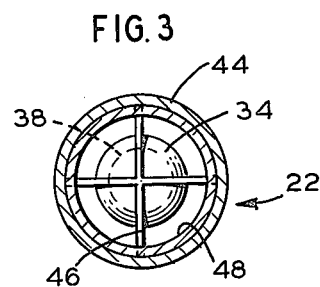
FIG. 3 is a cross-sectional view of the ball valve assembly of FIG. 2 taken along section 1—1.

During the "scram" condition wherein the leadscrew 14 must be quickly inserted into the reactor, however, the ball valve assembly 22 is opened to insure that the speedy insertion of the control rod is unhindered. The mounting of the ball valve assembly 22 insures that the piston 24 will always be located above the ball valve assembly 22 even under maximum control rod retraction. Thus if a "scram" condition is initiated, the leadscrew is freed from the slow drive assembly and is free to gravity fall into the reactor. The clearance 32 around the piston 24 is insufficient to displace enough liquid around itself to allow unretarded control rod drop and a negative pressure is caused in the area between the piston 24 and the upper seal 28. This negative pressure causes a ball 34 of the ball valve assembly 22 to move away from its sealed position to an unsealed position 36 as shown in dotted lines in FIG. 2. In this unsealed position fluid is allowed to flow from an opening 38 at the end of the ball valve assembly 22 into a cage area 40 formed in the ball valve assembly 22 to retain the ball 34. The cage area 40 is formed by end extension 42 of the ball valve assembly housing 44 at one end and by a ribbed section 46 formed in an insert 48 located internally of the housing 44. The ribbed section 46 has openings 50 which allow fluid from the opening 38 to easily flow around the ball 34, through the openings 50, into the opening 20 and therefrom into the chamber 30. Thus with the ball 34 allowing fluid flow into the chamber 30 any retardation action of the piston assembly 18 is negated and normal "scram" conditions are unaffected. The openings 38, 50, and 20 are predetermined to allow more than sufficient flow to enter the chamber 30 to insure normal gravity drop of the control rod assembly.

This speedy free fall of the control rod will continue until the piston 24 reaches the end of the cylinder 26 having exhaust openings 39. These openings allowed unhindered displacement of fluid between the piston 24 and the bottom seal 28 therethrough. When the piston 24 moves beyond the openings 39 a snubbing action is initiated by the fluid trapped between the piston 24 and the bottom seal 28 in the area 41. The fluid therein must be displaced around the piston 24 thereby slowing down the final drop of the control rod into the reactor.

Should ejection of the leadscrew 14 be initiated by a rupture condition, the leadscrew 14 and the piston 24 would quickly be moved toward the ball valve assembly 22 beyond the opening 39. The clearance 32 would be insufficient to displace the fluid trapped between the piston 24 and the upper seal 28 around the clearance 32 causing the chamber 30 to be pressurized. Pressurizing of the chamber 30 causes the ball 34 to move toward the opening 38 thereby sealing the opening 20 of the piston assembly 18. The only way the leadscrew can now move is by displacing fluid around the piston 24 through the opening 32. Since the opening 32 is predetermined to allow only normal slow driven control rod movement, the uncontrolled speedy ejection of the leadscrew and the control rod connected thereto is effectively retarded to normal levels.

In view of the foregoing it will be appreciated that the piston assembly 18 of the present invention provides a control rod ejection retardation system that becomes operative only when an undesired ejection of a control rod is initiated allowing unaffected normal control rod drive and "scram" operations.

Certain modifications and improvements will occur to those skilled in the art upon reading this specification. It will be understood that such were deleted for the sake of conciseness and readability but are within the scope of the appended claims.

What I claim is:

1. An ejection retardation assembly for a control rod drive of a nuclear reactor allowing unretarded normal driven and "scram" operations while retarding any undesired ejection of a control rod comprising: a reactor vessel
    control rod drive assembly having a leadscrew mounted in the nuclear reactor;
    piston means mounted on the leadscrew of the control rod drive to be movable with the leadscrew in said reactor vessel;
    enclosure means located in said reactor vessel to extend partially around the leadscrew to allow said piston means to move therein; and
    ejection retardation means for slowing down the movement of said piston means only when speedy ejection of a control rod is initiated due to a rupture in the control rod drive including a tubular portion formed in said enclosure means to provide a predetermined clearance for said piston means allowing the normal driven movement of said leadscrew and piston means therein and a ball valve assembly connected to said tubular portion to be located in said reactor vessel to allow fluid flow from said reactor vessel to said enclosure means to allow unretarded "scram" movement of said piston means therein and to shut off fluid flow from said reactor vessel to the enclosure means during speedy ejection of the leadscrew to retard the ejection of a control rod from the reactor thereby.

2. An assembly as set forth in claim 1 wherein said piston means includes a piston formed on a leadscrew of the control rod drive having a predetermined clearance between itself and said enclosure means to allow fluid to flow around said piston during normal driven movements of said leadscrew.

3. An assembly as set forth in claim 2 wherein said enclosure means includes a cylinder mounted within said reactor vessel having sealed ends and openings at opposite ends of said cylinder with said ball valve assembly being mounted to one of the openings.

4. An assembly as set forth in claim 3 wherein said ball valve assembly includes a ball movable in a cage assembly in response to pressure in said cylinder to control fluid flow to said cylinder.

5. An assembly as set forth in claim 4 wherein said ball moves to seal said opening of said cylinder whenever ejection of the control rod is attempted.

6. An assembly as set forth in claim 4 wherein said ball moves to open said opening of said cylinder whenever a "scram" condition is initiated by the control rod drive.

7. An assembly as set forth in claim 6 wherein said other of said openings is spacedly located from the end of said cylinder to provide a dashpot for said piston.

* * * * *